United States Patent
Zhang et al.

(10) Patent No.: US 10,537,124 B2
(45) Date of Patent: Jan. 21, 2020

(54) STABILIZING SORBIC ACID IN SYRUP AND FINISHED BEVERAGE

(71) Applicant: PepsiCo, Inc., Purchase, NY (US)

(72) Inventors: Naijie Zhang, Ridgefield, CT (US); William Mutilangi, Peekskill, NY (US)

(73) Assignee: PEPSICO, INC., Purchase, NY (US)

( * ) Notice: Subject to any disclaimer, the term of this patent is extended or adjusted under 35 U.S.C. 154(b) by 5 days.

(21) Appl. No.: 13/755,114

(22) Filed: Jan. 31, 2013

(65) Prior Publication Data

US 2014/0212564 A1  Jul. 31, 2014

(51) Int. Cl.
 A23L 3/358 (2006.01)
 A23L 2/52 (2006.01)
(52) U.S. Cl.
 CPC ............... *A23L 2/52* (2013.01); *A23L 3/358* (2013.01)
(58) Field of Classification Search
 None
 See application file for complete search history.

(56) References Cited

U.S. PATENT DOCUMENTS

| | | | | |
|---|---|---|---|---|
| 4,786,521 A | * | 11/1988 | Bennett et al. | 426/658 |
| 5,354,902 A | * | 10/1994 | Merciadez | A01N 37/06 562/601 |
| 5,385,748 A | * | 1/1995 | Bunger | A23L 2/38 426/590 |
| 5,389,391 A | * | 2/1995 | Monte | 426/335 |
| 5,641,532 A | * | 6/1997 | Pflaumer et al. | 426/590 |
| 5,888,569 A | * | 3/1999 | Jager et al. | 426/331 |
| 6,007,856 A | | 12/1999 | Cox et al. | |
| 6,013,294 A | * | 1/2000 | Bunke et al. | 426/120 |
| 6,132,787 A | * | 10/2000 | Bunger et al. | 426/330.3 |
| 6,440,482 B1 | * | 8/2002 | Henson | A23B 4/027 426/590 |
| 6,921,548 B2 | | 7/2005 | McCampbell | |
| 8,153,180 B2 | | 4/2012 | Grenville et al. | |
| 2004/0009274 A1 | * | 1/2004 | McCampbell | 426/330 |
| 2004/0062845 A1 | * | 4/2004 | Krawczyk | A23L 2/52 426/573 |
| 2005/0220969 A1 | * | 10/2005 | Loh et al. | 426/614 |
| 2007/0082095 A1 | * | 4/2007 | Loh et al. | 426/326 |
| 2007/0085058 A1 | * | 4/2007 | Mora-Gutierrez et al. | 252/400.21 |
| 2009/0041911 A1 | | 2/2009 | Gamay | |
| 2011/0223256 A1 | | 9/2011 | Zhang et al. | |
| 2011/0268847 A1 | | 11/2011 | Yang et al. | |
| 2012/0219677 A1 | * | 8/2012 | Tan et al. | 426/330.3 |
| 2012/0219680 A1 | * | 8/2012 | Yoo | A23L 2/385 426/330.3 |
| 2012/0219681 A1 | * | 8/2012 | Given | A23L 2/44 426/330.3 |

FOREIGN PATENT DOCUMENTS

| | | |
|---|---|---|
| CA | 2827889 A1 * | 11/2012 |
| CN | 103442597 A | 12/2013 |
| EP | 2653494 | 10/2013 |
| RU | 2448477 C1 | 4/2012 |
| WO | 2012/154245 A1 | 11/2012 |

OTHER PUBLICATIONS

PCT/US2014/012236, International Search Report and Written Opinion, dated Aug. 13, 2014.
Examination Report No. 1 for AU Appl. No. 2014212799, dated Oct. 30, 2015, IP Australia, Canberra, Australia, 4 pages.
Notification of the First Office Action for CN Appl. No. 201480006670.2, dated May 30, 2016, The State Intellectual Property Office of the People's Republic of China, Beijing, China, 8 pages.
Decision on Grant for RU Appl. No. 2015136811/13(056315), dated May 4, 2016, Rospatent, Federal Institute of Industrial Property, Moscow, Russian Federation, 6 pages.
English translation of Notification of the First Office Action for CN Appl. No. 201480006670.2, dated May 30, 2016, The State Intellectual Property Office of the People's Republic of China, Beijing, China, 10 pages.
English translation of Decision on Grant for RU Appl. No. 2015136811/13(056315), dated May 4, 2016, Rospatent, Federal Institute of Industrial Property, Moscow, Russian Federation, 2 pages.
International Preliminary Report on Patentability or International Application No. PCT/US2014/012236, The International Bureau of WIPO, Geneva, Switzerland, dated Aug. 4, 2015, 6 pages.

* cited by examiner

*Primary Examiner* — Tamra L. Dicus
(74) *Attorney, Agent, or Firm* — Sterne, Kessler, Goldstein & Fox P.L.L.C.

(57) ABSTRACT

Sorbic acid or benzoic acid is stabilized in syrup and finished beverages by solubilizing potassium sorbate or sodium benzoate and then adding the solubilized potassium sorbate or sodium or potassium benzoate into a stabilizer solution at pH 2-4.

18 Claims, 2 Drawing Sheets ially in
STABILIZING SORBIC ACID IN SYRUP AND FINISHED BEVERAGE

FIELD OF THE INVENTION

The invention relates to a method for stabilizing sorbic acid or benzoic acid in syrup and finished beverages.

BACKGROUND OF THE INVENTION

Sorbic acid (2,4-hexadienoic acid) is widely used as a preservative in foods and beverages. A common problem when using sorbic acid in beverage applications is low solubility in syrups and finished beverages.

Because of its low solubility, sorbic acid is unstable in syrups and finished beverages resulting in creaming and precipitates. For example, the solubility of sorbic acid in water at room temperature is 0.16 wt %. The solubility of sorbic acid in a solution containing 60 wt % sugar is 0.08 wt %. The solubility of sorbic acid in high acid syrup is less than 0.1 wt %.

It is desired to have at least 1200-1600 ppm sorbic acid in syrups and at least 200-250 ppm in finished beverages, but such amounts have been difficult to achieve due to low solubility, creaming, settling, precipitation, and phase separation.

Likewise benzoic acid is a widely used preservative but also has low solubility in concentrated syrup and finished beverage; thus it is also desired to increase the solubility of benzoic acid in syrups and finished beverages.

BRIEF SUMMARY OF THE INVENTION

An aspect of the invention relates to a method of preparing a sorbic acid micro-dispersion by solubilizing a salt of sorbic acid, in particular potassium sorbate, in water to form a potassium sorbate solution, adding a stabilizer with water to form a stabilizer solution; combining the potassium sorbate solution and stabilizer solution and mixing; and adjusting the pH to form a stabilized sorbic acid dispersion, wherein the viscosity of the dispersion is no greater than 1000 cps.

Another aspect relates to a method of making beverage syrup by adding the sorbic acid micro-dispersion described above to beverage syrup.

Another aspect relates to a method of making a soft drink beverage by adding carbonated water or treated water to the concentrated beverage syrup described above.

A further aspect of the invention relates to a method of preparing a benzoic acid micro-dispersion by solubilizing a salt of benzoic acid, in particular sodium benzoate or potassium benzoate, in water to form a sodium benzoate solution, adding a stabilizer with water to form a stabilizer solution; combining the sodium benzoate solution and stabilizer solution and mixing; and adjusting the pH to form a stabilized benzoic acid dispersion, wherein the viscosity of the dispersion is no greater than 1000 cps.

Another aspect relates to a method of making beverage syrup by adding the benzoic acid micro-dispersion described above to beverage syrup.

Another aspect relates to a method of making a soft drink beverage by adding carbonated water or treated water to the beverage syrup described above.

DETAILED DESCRIPTION OF THE INVENTION

Figure 1:
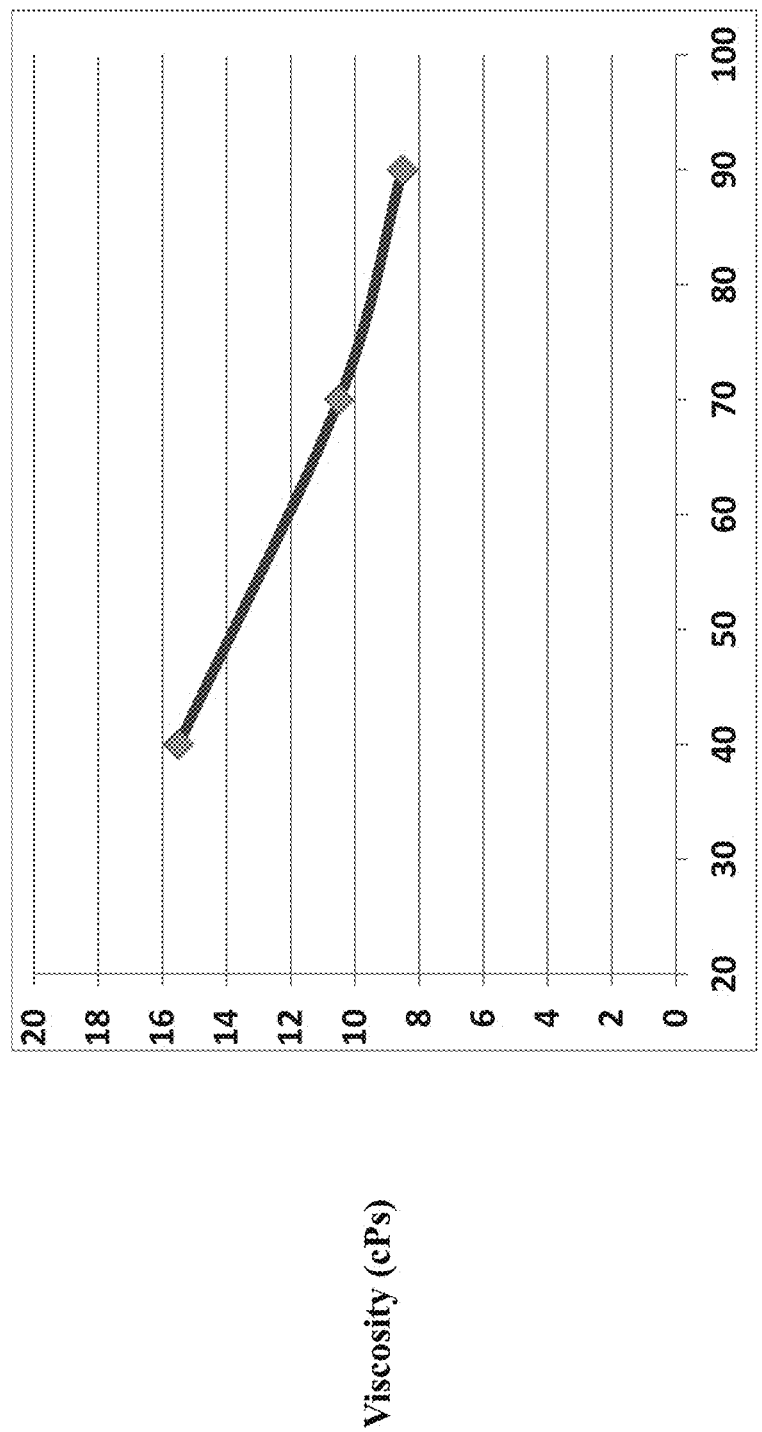
FIG. 1 depicts sorbic acid dispersion viscosity vs. temperature for a sorbic acid dispersion prepared in accordance with aspects of the present invention.

Aspects of the invention relate to a method for stabilizing sorbic acid or benzoic acid in syrup and finished beverages. A stabilizer is employed to stabilize the sorbic acid or benzoic acid as well as to maintain a low viscosity.

A micro-dispersion is formed with sorbic acid or benzoic acid and a stabilizer, such as gum arabic. The stabilized sorbic acid or benzoic acid micro-dispersion is shelf stable and has low viscosity of less than 200 cPs, in particular less than 100 cPs, as measured by Brookfield viscometer at 25° C. Concentrated syrups and finished beverages containing the stabilized sorbic acid or benzoic acid micro-dispersion are likewise shelf stable.

In the context of the present application, a beverage or concentrated syrup is stable if there is no creaming, settling, precipitation, or phase separation observed for at least 40 days at 35 to 110° F., in particular at 40 to 90° F.

A micro-dispersion means that sorbic acid or benzoic acid particles are present in the size of 0.1 to 50 microns, for example 0.5 to 10 microns.

In further aspects, the micro-dispersion may contain both sorbic acid and benzoic acid particles. In addition, the micro-dispersion is compatible with other preservatives such as, but not limited to, sodium hexametaphosphate, calcium/sodium (Ca/Na EDTA), and lauroyl arginine ethyl ester (LAE) in addition to the sorbic acid and benzoic acid particles.

The method of the invention will be discussed initially in relation to stabilizing sorbic acid, but unless otherwise specified, stabilizing benzoic acid will contain the same method steps and parameters.

Aspects of the invention relate to a method of preparing the sorbic acid micro-dispersions in accordance with the following steps:

Potassium sorbate is solubilized in water to form a potassium sorbate solution. Potassium sorbate is readily soluble in water, e.g. 45 wt % in water at room temperature. The concentration of potassium sorbate in water is in the range of 30-65 wt %. The temperature of the water in the solution is 20 to 100° C., for example 20 to 80° C., or 25 to 60° C., or 45 to 60° C.

A stabilizer solution is formed by dissolving or dispersing a stabilizer in water. The stabilizer is present in the stabilizer solution in an amount of 0.1 to 40 wt %, for example 0.5 to 30 wt %. The temperature of the water is 30 to 60° C. and may be the same or different from the temperature of the potassium sorbate solution.

The potassium sorbate solution is combined with the stabilizer solution under high shear mixing at 3000-10000 rpm wherein the pH is maintained at 3 to 5 to convert all sorbate to sorbic acid and form the micro-dispersion. The temperature of the combined solutions remains between 20-60° C., for example 40-50° C.

The resulting amount of sorbic acid in dispersion is in the range of 1-30 w/w, for example 3-20 w/w. The dispersion contains 0.1-25 wt %, for example 0.3-20 wt % stabilizer and 3 to 20 wt % sorbic acid.

The sorbic acid dispersion is further mixed under high shear mixing for 5 minutes. If necessary, the pH of the dispersion is adjusted to 2.5 to 4, for example 2.8 to 3.5, by adding a food grade acid. The acid is added in an amount to achieve the desired pH and is well within the skill of the art. The dispersion of sorbic acid and gum arabic is more stable (less settling) at pH levels of 2.8-3.5. As pH is increased, the dispersion viscosity increases.

To reduce the particle size, the sorbic acid dispersion further undergoes homogenization at 3000-5000 psi for 1-2 pass resulting homogeneous, fine dispersion. The particle size in the dispersion, for example to a particle size of 0.1 to 5 microns. The viscosity of the dispersion is less than 200 cPs as measured by Brookfield viscometer at 25° C.

The stability of sorbic acid is related to the level of stabilizer. For example, the dispersion settles at 5-10% sorbic acid solid when the amount of gum arabic is less than 8 wt %. The stability of sorbic acid dispersion depends on the viscosity. The dispersion stability increases as viscosity increases. As shown in the examples, the dispersion is stable with no creaming, settling, precipitation, or phase separation when dispersion contains 0.1-20 wt % stabilizers and 5-15 wt % sorbic acid.

For example, a stable sorbic acid dispersion is obtained when carboxymethyl cellulose (CMC) is used as a stabilizer. The level of CMC in the dispersion is in the range of 0.1-3% w/w depending on the molecular weight of CMC. The viscosity of the dispersion with CMC is in the range of 10-1000 cPs for example 25-100 cPs.

The dispersion is added into syrup to provide a concentration of 0.12-0.5 wt % (1200-5000 ppm) sorbic acid in the syrup. The syrup is mixed thoroughly by any suitable method such as mechanical mixing. The syrup containing the sorbic acid dispersion is stable and homogeneous. The sorbic acid dispersion syrup is instantly soluble when it is diluted into carbonated water resulting in clear softer beverage.

The resulting CSD beverage contains 200-800 ppm, for example, 250-650 ppm, sorbic acid. In one example, the finished CSD beverage contains 250 ppm sorbic acid. The resulting beverage is stable.

In a similar way, shelf stable benzoic acid dispersion is prepared. Sodium or potassium benzoate is solubilized in water to form a sodium or potassium benzoate solution. Sodium benzoate is readily soluble in water, e.g. 30 wt % in water at room temperature. Likewise, potassium benzoate is readily soluble in water, e.g. 39 wt % in water at room temperature. The concentration of sodium or potassium benzoate in water is in the range of 30-65 wt % at temperature between 20-70° C. The temperature of the water in the solution is 20 to 100° C., for example 20 to 80° C., or to 60° C., or 45 to 60° C.

A stabilizer solution is formed by dissolving or dispersing a stabilizer in water. The stabilizer is present in the stabilizer solution in an amount of 0.1 to 40 wt %, for example 0.5 to 30 wt %. The pH of the stabilizer-containing solution is kept at 2.5-4. The temperature of the water is 30 to 60° C. and may be the same or different from the temperature of the sodium or potassium benzoate solution.

The sodium or potassium benzoate solution is combined with the stabilizer solution under high shear mixing at 3000-10000 rpm wherein the pH is maintained at 2.5 to 5 to convert all benzoate to benzoic acid and form the microdispersion. The temperature of the combined solutions remains between 20-60° C., for example 40° C.

The resulting amount of benzoic acid in dispersion is in the range of 1-30 w/w, for example 5-10 w/w. The dispersion contains 0.1-25 wt %, for example 0.3-20 wt %, stabilizer and 5-20 wt % benzoic acid.

The benzoic acid dispersion is further mixed under high shear mixing for 2 to 5 minutes, for example 5 minutes. The final dispersion pH is adjusted from between 2.5 to 4 using any suitable food grade acid as discussed above. The stability of benzoic acid dispersion depends on the viscosity. The dispersion stability increase as increasing viscosity.

For example, stable benzoic acid dispersions are obtained when carboxymethyl cellulose (CMC) is used as a stabilizer. The level of CMC in the dispersion is in the range of 0.1-3% w/w depending on the molecular weight of the CMC. The viscosity of benzoic acid dispersion with CMC is in the range of 10-1000 cPs, for example 25-100 cps.

Benzoic acid dispersion is added into syrup in a concentration of 0.1-0.5 w/t %. The syrup of pH is adjusted to pH 2.5-4 with a suitable food grade acid.

The syrup containing the benzoic acid dispersion is stable and homogeneous. The benzoic acid dispersion syrup is instantly soluble when it is diluted into carbonated water or treated water resulting in clear softer beverage.

The resulting beverage contains 200-800 ppm, for example, 250-500 ppm, benzoic acid. In one example, the finished beverage contains 250 ppm benzoic acid. The resulting beverage is stable.

The water suitable with any aspect of the invention may be treated to reduce the total dissolved solids of the water. Methods of producing treated water are known to those of ordinary skill in the art and include deionization, distillation, filtration and reverse osmosis ("r-o"), among others. The terms "treated water," "purified water," "demineralized water," "distilled water," and "r-o water" are understood to be generally synonymous in this discussion, referring to water from which substantially all mineral content has been removed, typically containing no more than about 500 ppm total dissolved solids, e.g. 250 ppm total dissolved solids The stabilizer suitable with any aspect of the invention may be any suitable biopolymer or a modified polysaccharide such as gum arabic, carboxymethyl cellulose (CMC), gellan gum, pectin, carrageenan, ghatti gum, guar gum, xanthan gum, locust gum, agar, starch, alginate, cellulose, modified starch, or any combination thereof. Suitable gums generally have a molecular weight of 10,000 to 1,000,000 Daltons. For example, such stabilizers reduce sorbic acid particle size, increase dispersion stability by electrostatic and steric repulsion, and prevent sorbic aid from crystallization, aggregation, and flocculation.

The food grade acid suitable with any aspect of the invention may be any suitable acid such as citric acid, phosphoric acid, tartaric acid, maleic acid, or glutaric acid. Typically, citric acid or phosphoric acid is used The beverage syrup suitable with any aspect of the invention may be any suitable beverage syrup suitable for carbonated soft drinks. Such syrups typically contain sugar in concentrations of 40 w/w % to 70 w/w % for example, cane sugar or HFCS. Alternatively, the syrups may be of the "diet" soda variety with non-nutritive sweeteners such as, but not limited to, acesulfame potassium, aspartame, saccharin, sucralose, neotame, monatin, sodium cyclamate, and steviol glycosides. Other ingredients include flavorants such as cola or citrus flavors and colorants, food acids such as citric acid, vitamins, preservative cocktail, and caffeine.

Typically a beverage is formed by combining 1 part syrup with 3-7 parts water, most typically 1 part syrup to 5 parts water (called a 1:5 throw). A typical non-nutritive beverage is formed by combining 1 part non-nutritive syrup with 30-50 parts water. In forming carbonated soft drinks (CSDs), the syrup is diluted with treated carbonated water.

The dispersion is pumpable so it may be used in fountain dispensers. Hence, at the fountain dispenser, the syrup is combined with the carbonated water to form the beverage for immediate consumption.

Example 1

8.3% Sorbic Acid/9.3% Gum Arabic Dispersion

In a 200 ml beaker, 30 g potassium sorbate and 25 g water were added. Sorbate mixture was heated (45-60° C.) until completely dissolved. Sorbate solution was slowly added into 100 g gum arabic solution (25%) and 50 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes. The final sorbic acid dispersion pH was adjusted 2.8-3.5.

Example 2

0.15% Sorbic Acid Syrup

In a 1000 mL beaker, 312 g sucrose, 1.3 g potassium citrate, 4.3 g citric acid, 11 g Example 1 sorbic acid dispersion, and 289 g water. The mixture was mixed at room temperature until all ingredients dissolved.

Example 3

Carbonated Soft Drink with 250 ppm Sorbic Acid

Concentrated syrup (150 mL Example 2) was diluted into 750 mL carbonated water resulting in finished beverage.

Example 4

8.1% Sorbic Acid/4.5% Gum Arabic Dispersion

In a 200 ml beaker, 30 g potassium sorbate and 30 g water were added. Sorbate mixture was heated (45-60° C.) until completely dissolved. Sorbate solution was slowly added into 50 g gum arabic solution (25%) and 100 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes. The final sorbic acid dispersion pH was adjusted 2.8-3.5.

Example 5

10.5% Sorbic Acid/5.8% Gum Arabic Dispersion

In a 200 ml beaker, 30 g potassium sorbate and 30 g water were added. Sorbate mixture was heated (45-60° C.) until completely dissolved. Sorbate solution was slowly added into 50 g gum arabic solution (25%) and 50 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes. The final sorbic acid dispersion pH was adjusted 2.8-3.5.

Example 6

6.8% Sorbic Acid/3.8% Gum Arabic Dispersion

In a 500 ml beaker, 90 g potassium sorbate and 170 g water were added. Sorbate mixture was heated (45-60° C.) until completely dissolved. Sorbate solution was slowly added into 150 g gum arabic solution (25%) and 150 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes and then homogenized at 3000-5000 psi. The final sorbic acid dispersion pH was adjusted 2.8-3.5.

Example 7

6.8% Sorbic Acid/5.5% Gum Arabic Dispersion

In a 500 ml beaker, 90 g potassium sorbate and 170 g water were added. Sorbate mixture was heated (45-60° C.) until completely dissolved. Sorbate solution was slowly added into 220 g gum arabic solution (25%) and 200 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes and then homogenized at 3000-5000 psi. The final sorbic acid dispersion pH was adjusted 2.8-3.5.

Example 8

6.8% Sorbic Acid/7.5% Gum Arabic Dispersion

In a 500 ml beaker, 90 g potassium sorbate and 111 g water were added. Sorbate mixture was heated (45-60° C.) until completely dissolved. Sorbate solution was slowly added into 300 g gum arabic solution (25%) and 150 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes and then homogenized at 3000-5000 psi. The final sorbic acid dispersion pH was adjusted 2.8-3.5.

Example 9

9.6% Sorbic Acid/5.3% Gum Arabic Dispersion

In a 500 ml beaker, 90 g potassium sorbate and 110 g water were added. Sorbate mixture was heated (45-60° C.) until completely dissolved. Sorbate solution was slowly added into 150 g gum arabic solution (25%) and 150 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes and then homogenized at 3000-5000 psi. The final sorbic acid dispersion pH was adjusted 2.8-3.5.

Example 10

4.7% Sorbic Acid/9.3% Gum Arabic Dispersion

In a 200 ml beaker, 34 g potassium sorbate and 56 g water were added. Sorbate mixture was heated (45-60° C.) until completely dissolved. Sorbate solution was slowly added into 200 g gum arabic solution (25%) and 200 g citric acid solution (30%) under high shear mixing. The dispersion pH was kept between 3-4 by adding citric acid and temperature maintained below 60° C. After completing addition of potassium sorbate solution, the dispersion slurry was further mixed for 3-5 minutes. The final sorbic acid dispersion pH was adjusted 2.80.

Example 11

5.7% Sorbic Acid/12.8% Gum Arabic Dispersion

In a 200 ml beaker, 30 g potassium sorbate and 60 g water were added. Sorbate mixture was heated (45-60° C.) until completely dissolved. Sorbate solution was slowly added into 200 g gum arabic solution (25%) and 60 g citric acid solution (50%) under high shear mixing. The dispersion pH was kept between 3-4 by adding citric acid and temperature maintained below 60° C. After completing addition of potassium sorbate solution, the dispersion slurry was further mixed for 3-5 minutes and then homogenized at 3000 psi. The final sorbic acid dispersion pH was adjusted 3.05.

Example 12

7.8% Sorbic Acid/11.8% Gum Arabic Dispersion

In a 200 ml beaker, 44 g potassium sorbate and 46 g water were added. Sorbate mixture was heated (45-60° C.) until completely dissolved. Sorbate solution was slowly added into 200 g gum arabic solution (25%) and 60 g citric acid solution (50%) under high shear mixing. The dispersion pH was kept between 3-4 by adding citric acid and temperature maintained below 60° C. After completing addition of potassium sorbate solution, the dispersion slurry was further mixed for 3-5 minutes and then homogenized at 3000 psi. The final sorbic acid dispersion pH was adjusted 3.00.

Example 13

7.4% Benzoic Acid/12.2% Gum Arabic Dispersion

In a 200 ml beaker, 36 g sodium benzoate and 63 g water were added. Sodium benzoate mixture was heated (45-60° C.) until completely dissolved. Benzoate solution was slowly added into 200 g gum arabic solution (25%) and 60 g citric acid solution (50%) under high shear mixing. The dispersion pH was kept between 3-4 by adding citric acid and temperature maintained below 60° C. After completing addition of sodium benzoate solution, the dispersion slurry was further mixed for 3-5 minutes and then homogenized at 3000 psi. The final benzoic acid dispersion pH was adjusted to 3.00.

Example 14

0.165% Sodium Benzoate Non-nutritive Syrup

In a 1000 mL beaker, 5.4 g aspartame, 1.4 g acesulfame potassium, 9.4 g Example 13 benzoic acid dispersion, and 483.8 g water. The mixture was mixed at room temperature until all ingredients dissolved. The solution pH was adjusted 3.85 by phosphoric acid (50%).

Example 15

0.165% Potassium Sorbate Non-nutritive Syrup

In a 1000 mL beaker, 5.4 g aspartame, 1.4 g acesulfame potassium, 7.9 g Example 12 sorbic acid dispersion, and 485.3 g water. The mixture was mixed at room temperature until all ingredients dissolved. The solution pH was adjusted 3.85 by phosphoric acid (50%).

Example 16

10.7% Benzoic Acid/17.5% Gum Arabic Dispersion

In a 200 ml beaker, 30 g sodium benzoate and 74 g water were added. Sodium benzoate mixture was heated (45-70° C.) until completely dissolved. Benzoate solution was slowly added into 140 g gum arabic solution (35%) and 25 g phosphoric acid solution (50%) under high shear mixing. The dispersion pH was kept between 3-4 by adding phosphoric acid and temperature maintained below 60° C. After completing addition of sodium benzoate solution, the dispersion slurry was further mixed for 3-5 minutes. The final benzoic acid dispersion pH was adjusted to 3.00.

Example 17

0.165% Sodium Benzoate Non-nutritive Syrup

In a 1000 mL beaker, 5.4 g aspartame, 0.55 g antifoam (Momentive SAG 710), and 485 g water were added. The mixture was heated at 32-40° C. until aspartame dissolved. Then, 1.4 g acesulfame potassium, 7.69 g Example 16 benzoic acid dispersion were added. The mixture was mixed for 30 minutes at 25-35° C. The solution pH was adjusted 3.9 by sodium hydroxide (3N). The non-nutritive syrup was diluted with carbonated water in a 1:30 throw resulting in CSD beverage.

Example 18

0.165% Sodium Benzoate Non-nutritive Syrup

In a 1000 mL beaker, 4.88 g aspartame, 0.725 g antifoam (Momentive SAG 710), and 459 g water were added. The mixture was heated at 32-40° C. until aspartame dissolved. Then, 1.4 g acesulfame potassium, 26.06 g sucralose (25%), and 7.69 g Example 16 benzoic acid dispersion were added. The mixture was mixed for 30 minutes at 25-35° C. The solution pH was adjusted 3.9 by sodium hydroxide (3N). The non-nutritive syrup was diluted with carbonated water in a 1:40 throw resulting in CSD beverage.

Example 19

8.1% Sorbic Acid/12.3% Gum Arabic Dispersion

In a 200 ml beaker, 44 g potassium sorbate and 46 g water were added. Sorbate mixture was heated (45-60° C.) until completely dissolved. Sorbate solution was slowly added into 200 g gum arabic solution (25%) and 30 g phosphoric acid solution (50%) under high shear mixing. The dispersion pH was kept between 3-4 by adding phosphoric acid (50%) and temperature maintained below 60° C. After completing addition of sorbate solution, the dispersion slurry was further mixed for 3-5 minutes and then homogenized at 3000 psi. The final sorbic acid dispersion pH was adjusted 3.00.

Example 20

10% Sorbic Acid/1.35% CMC Dispersion

In a 200 ml beaker, 44 g potassium sorbate and 46 g water were added. Sorbate mixture was heated (45-60° C.) until completely dissolved. Sorbate solution was slowly added into 200 g pre-hydrated carboxymethyl cellulose (Cekol 2000) solution (2.22% CMC) and 30 g phosphoric acid solution (50%) under high shear mixing. The dispersion pH was kept between 3-3.5 by adding phosphoric acid (50%) and temperature maintained below 60° C. The final sorbic acid dispersion pH was adjusted 3.00.

Example 21

8.2% Benzoic acid/0.74% CMC Dispersion

In a 200 ml beaker, 33 g sodium benzoate and 80 g water were added. Benzoate mixture was mixed at room temperature until completely dissolved. Benzoate solution was slowly added into 193 g pre-hydrated carboxymethyl cellulose (Cekol 2000) solution (1.3% CMC) and 30 g phosphoric acid solution (50%) under high shear mixing. The dispersion pH was kept between 3-3.5 by adding phosphoric acid (50%) and temperature maintained below 60° C. The final benzoic acid dispersion pH was adjusted 3.00.

Example 22

8.3% Benzoic acid/0.69% CMC Dispersion

In a 200 ml beaker, 36 g sodium benzoate and 80 g water were added. Benzoate mixture was mixed at room temperature until completely dissolved. Benzoate solution was slowly added into 203 g pre-hydrated carboxymethyl cellulose (Cekol 2000) solution (1.09% CMC) and 30 g phosphoric acid solution (50%) under high shear mixing. The dispersion pH was kept between 3-3.5 by adding phosphoric acid (50%) and temperature maintained below 60° C. The final benzoic acid dispersion pH was adjusted 3.00.

Example 23

8.4% Benzoic Acid/0.59% CMC Dispersion

In a 200 ml beaker, 36 g sodium benzoate and 80 g water were added. Benzoate mixture was mixed at room temperature until completely dissolved. Benzoate solution was slowly added into 202 g pre-hydrated carboxymethyl cellulose (Cekol 2000) solution (1.04% CMC) and 30 g phosphoric acid solution (50%) under high shear mixing. The dispersion pH was kept between 3-3.5 by adding phosphoric acid (50%) and temperature maintained below 60° C. The final benzoic acid dispersion pH was adjusted 3.00.

Example 24

7.8% Benzoic acid/0.93% CMC Dispersion

In a 200 ml beaker, 30 g sodium benzoate and 80 g water were added. Benzoate mixture was mixed at room temperature until completely dissolved. Benzoate solution was slowly added into 200 g pre-hydrated carboxymethyl cellulose (Cekol 2000) solution (1.5% CMC) and 30 g phosphoric acid solution (50%) under high shear mixing. The dispersion pH was kept between 3-3.5 by adding phosphoric acid (50%) and temperature maintained below 60° C. After completing addition of benzoate solution, the dispersion slurry was further mixed for 3-5 minutes and then homogenized at 3000 psi. The final benzoic acid dispersion pH was adjusted 3.00.

Example 25

0.15% Sorbic Acid/0.3% Sodium Hexametaphosphate/0.018% Ca/Na EDTA Syrup

In a 1000 mL beaker, 312 g sucrose, 1.3 g potassium citrate, 4.3 g citric acid, 9.6 g Example 9 sorbic acid dispersion, 1.8525 g sodium hexametaphosphate, 0.1112 g Ca/Na EDTA, and 288 g water. The mixture was mixed at room temperature until all ingredients dissolved.

Example 26

Carbonated Soft Drink with 250 ppm Sorbic Acid/500 ppm Sodium Hexametaphosphate/30 ppm Ca/Na EDTA Concentrated syrup (150 mL Example 10) was diluted into 750 mL carbonated water resulting in finished beverage.

Example 27

This example demonstrates the solubility and stability of sorbic acid powder and sorbic acid dispersions prepared from potassium sorbate in water. In one sample, sorbic acid powder was added directly to water. In a second sample, sorbic acid was formed from solubilizing potassium sorbate and converting the sorbate to sorbic acid without a stabilizer. In a third sample, sorbic acid was formed from solubilizing potassium sorbate and converting the sorbate to sorbic acid with a stabilizer. As can be seen in the table below, sorbic acid dispersion with gum arabic provided a stable solution having a viscosity of less than 50 cp.

| Sample | Sorbic Acid % | Viscosity (cp) | Stability |
|---|---|---|---|
| Sorbic Acid Powder in Water | 10 | N/A | Insoluble |
| Sorbic Acid Dispersion without Gum Arabic | 10 | >1000 | Unstable/Phase Separation |
| Sorbic Acid Dispersion with Gum Arabic | 10 | <20 | Stable |

Example 28

This example demonstrates the stability of sorbic acid dispersions in finished beverages. Sorbic acid dispersions were tested in finished beverages at temperatures of 40, 70, and 90° F. at concentrations of 200-560 ppm. There were no precipitates over the storage time of 40 days. Beverages containing the sorbic acid dispersions and caffeine were also stable and clear.

| Sorbic Acid (ppm) | Caffeine (ppm) | Storage Time 40, 70, 90° F. (days) | Stability |
| --- | --- | --- | --- |
| 200 | 0 | 40 | Stable/Clear |
| 200 | 100 | 40 | Stable/Clear |
| 250 | 0 | 40 | Stable/Clear |
| 500 | 0 | 40 | Stable/Clear |
| 560 | 300 | 40 | Stable/Clear |

Example 29

This example demonstrates the compatibility of a sorbic acid dispersion combined with other preservatives sodium hexametaphosphate (SHMP) and calcium/sodium EDTA (Ca/Na EDTA) in preservative cocktail system. Both the concentrated syrup and finished beverage prepared with the sorbic acid dispersion and sodium hexametaphosphate (SHMP) and Ca/Na EDTA were shelf stable with no precipitates over time.

| Sorbic Acid Dispersion (Example 9) | Concentrated Syrup Composition (Example 10) | Finished Beverage Composition by 1 to 5 throw (Example 11) | Beverage Stability (40, 70, 90° F. 40 days) |
| --- | --- | --- | --- |
| 9.6% sorbic acid | 0.15% sorbic acid 0.3% SHMP. 0.018% Ca/Na EDTA 60% HFCS, pH 3.1 (homogeneous stable syrup) | 250 ppm sorbic acid 500 ppm SHMP 30 ppm Ca/Na EDTA 10% HFCS, pH 3.0 | stable/clear |

Example 30

The viscosity of a sorbic acid dispersion having 6.7 wt % solids was tested over various temperatures. The results show that the sorbic acid dispersion has a low viscosity which increases slightly with decreasing temperature. As shown in FIG. 1, the sorbic acid dispersion had less than 20 cPs viscosity between temperatures of 40-90° F.

Example 31

Figure 2:
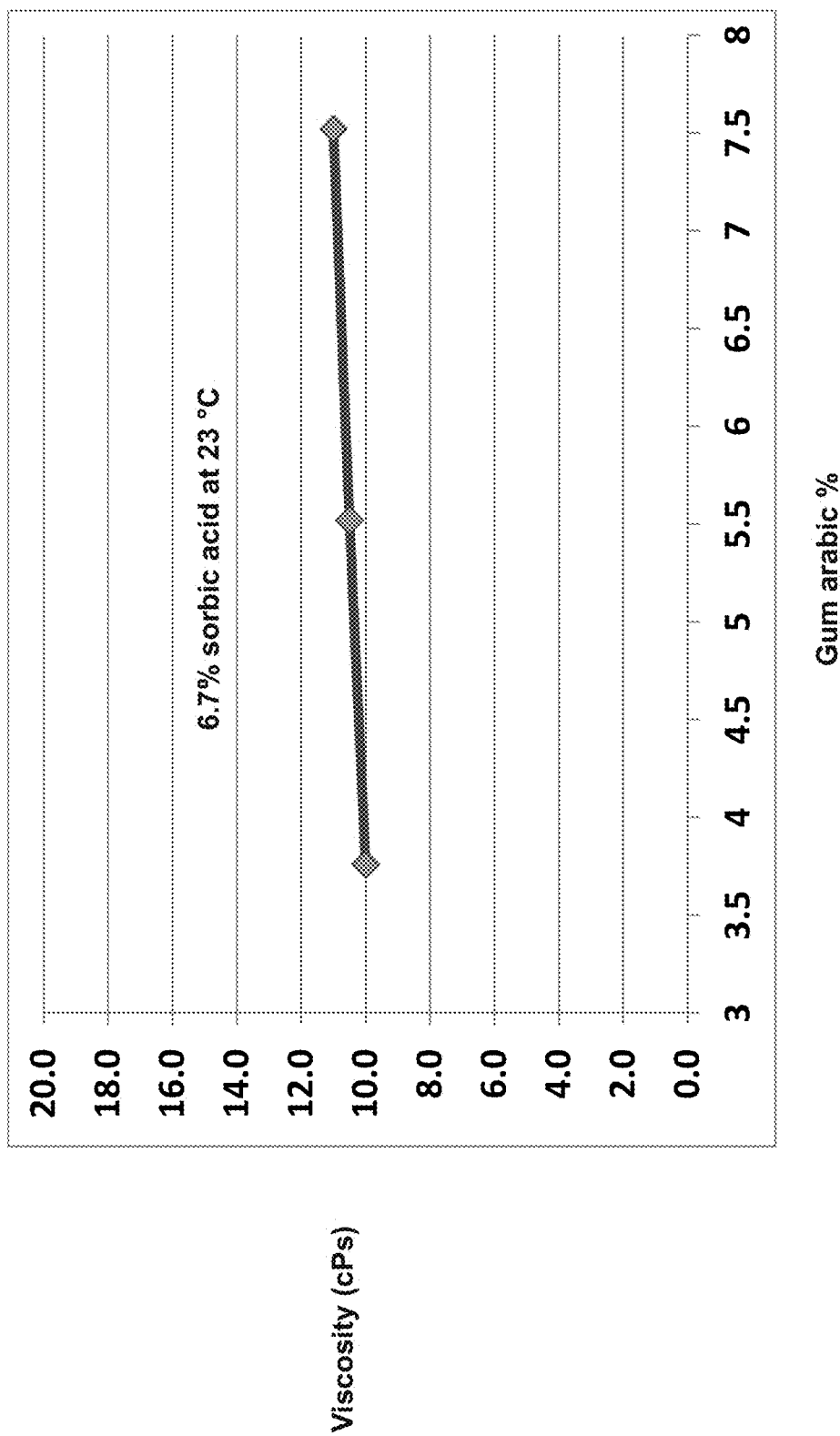
FIG. 2 depicts sorbic acid dispersion viscosity vs. % of gum arabic for a sorbic acid dispersion prepared in accordance with aspects of the present invention.

The viscosity of sorbic acid dispersions having at 6.7% solids and different amounts of gum arabic were tested at 23° C. The dispersion viscosity slightly increases with increasing gum arabic. FIG. 2 demonstrates that the sorbic acid dispersion exhibited low viscosity with gum arabic in the range of 3.75-7.50 w/w %.

Sorbic Acid/Benzoic Acid Dispersion Stability
(Aged 20 Days at 25° C.)

| Example | | Stability |
| --- | --- | --- |
| 1 | 8.3% sorbic acid/9.3% gum arabic | No sediments |
| 4 | 8.1% sorbic acid/4.5% gum arabic | Sediments |
| 5 | 10.5% sorbic acid/5.8% gum arabic | Sediments |
| 6 | 6.8% sorbic acid/3.8% gum arabic | Sediments |
| 7 | 6.8% sorbic acid/5.5% gum arabic | Sediments |
| 8 | 6.8% sorbic acid/7.5% gum arabic | Slight sediments |
| 9 | 9.6% sorbic acid/5.3% gum arabic | Sediments |
| 10 | 4.7% sorbic acid/9.3% gum arabic | No Sediments |
| 11 | 5.7% sorbic acid/12.8% gum arabic | No Sediments |
| 12 | 7.8% sorbic acid/11.8% gum arabic | No Sediments |
| 13 | 7.4% benzoic acid/12.2% gum arabic | No Sediments |
| 16 | 9.1% benzoic acid/17.5% gum arabic | No Sediments |
| 19 | 8.1% sorbic acid/12.3% gum arabic | No Sediments |
| 20 | 10% sorbic acid/1.35% CMC | No sediments |
| 21 | 8.2% benzoic acid/0.74% CMC | No sediments |
| 22 | 8.3% benzoic acid/0.69% CMC | No sediments |
| 23 | 8.4% benzoic acid/0.59% CMC | No sediments |
| 24 | 7.8% benzoic acid/0.93% CMC | No sediments |

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method of preparing a stabilized micro-dispersion comprising
   a. solubilizing a sorbate in water to form a sorbate solution, wherein the temperature of the water is 20 to 100° C.;
   b. combining a stabilizer with water to form a stabilizer solution, wherein the stabilizer is a biopolymer or a modified polysaccharide;
   c. combining the sorbate solution and stabilizer solution and mixing to form a sorbic acid micro-dispersion comprising 1 to 30 wt % stabilizer and 5 to 15 wt % sorbic acid based on total weight of the micro-dispersion; and
   d. adjusting the pH of the micro-dispersion to 2.5 to 4, wherein the viscosity of the dispersion is no greater than 1000 cPs at 25° C.

2. The method of claim 1 wherein the viscosity of the micro-dispersion is no greater than 100 cPs at 25° C.

3. The method of claim 1 comprising in step a. solubilizing potassium sorbate to form a solution comprising 30-65 wt % potassium sorbate.

4. The method of claim 1 wherein, in step a. the temperature of the water is 20 to 70° C.

5. The method of claim 1 wherein the stabilizer is selected from the group consisting of gum arabic, carboxymethyl cellulose (CMC), gellan gum, pectin, carrageenan, ghatti gum, guar gum, xanthan gum, locust gum, agar, starch, alginate, cellulose, modified starch, or the combination thereof.

6. The method of claim 5 wherein the stabilizer is gum Arabic.

7. The method of claim 5 wherein the stabilizer is CMC and wherein CMC is present in the micro-dispersion in the range of 0.1-3% w/w and the viscosity of the dispersion is in the range of 10-1000 cPs.

8. The method of claim 1 wherein the sorbate solution is combined with the stabilizer solution under high shear mixing at pH 2.5-4.0.

9. The method of claim 1 further comprising homogenizing the sorbic acid dispersion at 3000-10000 psi to reduce the particle size in the dispersion to 0.1 to 50 microns.

10. The method of claim 1 wherein the micro-dispersion further comprises a preservative selected from the group consisting of sodium hexametaphosphate, calcium/sodium EDTA (Ca/Na EDTA), and lauroyl arginine ethyl ester (LAE).

11. The method of claim 1 comprising in step a. solubilizing a sorbate and a benzoate in water.

12. The method of claim 1 wherein the micro-dispersion is stable for at least 40 days at 35 to 110° F. with no settling, precipitates, or phase separation.

13. A method of making beverage syrup comprising preparing a sorbic acid dispersion in accordance with the method of claim 1 and adding the sorbic acid dispersion to a syrup to provide a concentration of 0.10-0.5 wt % sorbic acid based on total weight of the beverage syrup.

14. A method of making a soft drink beverage comprising adding 3-7 parts carbonated water or treated water to 1 part of the beverage syrup formed in claim 13.

15. The method of claim 14 wherein the beverage contains 0.005-0.08 wt % sorbic acid based on total weight of the beverage.

16. A method of making a beverage syrup comprising preparing a sorbic acid dispersion in accordance with the method of claim 1 and adding the sorbic acid dispersion to a non-nutritive syrup to provide a concentration of 0.1-0.5 wt % sorbic acid based on total weight of the beverage syrup.

17. A method of making a soft drink beverage comprising adding 20-60 parts carbonated water or treated water to 1 part of the beverage syrup formed in claim 16.

18. The method of claim 1, wherein the temperature of the combined solutions remains between 20 and 60° C.

\* \* \* \* \*